United States Patent [19]

Karasek et al.

[11] Patent Number: 4,923,719

[45] Date of Patent: May 8, 1990

[54] METHOD OF COATING SILICON CARBIDE FIBERS

[75] Inventors: Keith R. Karasek, Elk Grove Village, Ill.; William L. Olson, Solvang, Calif.; Jeffry T. Donner, Lake Zurich, Ill.

[73] Assignee: Allied-Signal Inc., Morris Township, Morris County, N.J.

[21] Appl. No.: 234,766

[22] Filed: Aug. 22, 1988

[51] Int. Cl.$^5$ .............................................. B05D 3/02
[52] U.S. Cl. ..................................... 427/387; 428/447
[58] Field of Search ............................ 427/397.7, 387; 428/447

[56] References Cited

U.S. PATENT DOCUMENTS

| | | | |
|---|---|---|---|
| 4,131,697 | 12/1978 | Randon et al. | 427/249 |
| 4,373,006 | 2/1983 | Galasso et al. | 428/368 |
| 4,460,638 | 7/1984 | Haluska | 427/387 |
| 4,460,639 | 7/1984 | Chi et al. | 427/387 |
| 4,460,640 | 7/1984 | Chi et al. | 427/387 |

OTHER PUBLICATIONS

"Interfaces in Alumina-SiC Fiber Composites", Ceramic Microstructures 86: The Role of Interfaces, J. Pask and A. G. Evans, editors, Material Science Res. Ser. #21, pp. 911-918 (1987).

*Primary Examiner*—Michael Lusignan
*Attorney, Agent, or Firm*—Frank S. Molinaro; Harold N. Wells; Gerard P. Rooney

[57] ABSTRACT

This invention relates to a method of coating fibers by contacting the fibers with an organochlorosilane, drying and heating the fibers at a temperature of about 300° to 500° C., thereby coating the fibers. The choice of organochlorosilane and atmosphere under which the heating takes place will determine the composition of the coating.

12 Claims, No Drawings

METHOD OF COATING SILICON CARBIDE FIBERS

BACKGROUND OF THE INVENTION

Silicon carbide filers have many uses such as a reinforcement material for ceramic matrix composites. For example, silicon carbide (SiC) reinfored silicon nitride ($Si_3N_4$) powder can be used for the manufacture of turbine blades. Before firing, the well known process of slip casting can be used to produce a SiC fiber/$Si_3N_4$ powder compact in the form of the turbine blade. Slip casting, used for many years to produce single component powder compacts, involves the dispersion of the powder in a liquid, typically water. It has been found that the slip casting process is dependent on the surface chemistry and composition of the powders. When a particular powder does not disperse well in slip casting medium, a modification—such as changing the pH or adding a dispersant—can often be made which will allow proper dispersion. In a SiC fiber reinforced ceramic the situation is more complicated as two very different surfaces are present. A further complication is that SiC fibers available commercially can have dramatically different surfaces. Thus, if processing conditions are developed for one type of fiber with a particular surface composition, a suitable product may not be produced if a fiber with a different surface composition is used.

There are other advantages to using fibers with a consistent surface composition. For example, the surface composition of SiC fibers (or other types of fibers) affects the reactions and/or the reaction kinetics between the fibers and the matrix. It has been demonstrated that use of SiC fibers from different sources can result in significant difference in fracture toughness values in SiC fiber inforced $Al_2O_3$. Recently, Tiegs and coworkers in "Interfaces in Alumnina-SiC Fiber Composites", *Ceramic Microstructures 86: The Role of Interfaces*, J. Pask and A. G. Evans, editors, Material Sciences Res. Ser. #21, pages 911-918 (1987), reported experimental results which indicated that surface silica content was a controlling factor for the SiC fiber reinforced $Al_2O_3$ composite fracture toughness. The higher toughness is attributed to lower surface $SiO_2$ (silica) content, probably due to the lower reactivity between fiber and matrix than for fibers with high $SiO_2$ surface content.

One of the basic problems in the development of SiC fiber reinforced $Si_3N_4$ composites is chemical attack upon SiC fibers by sintering aids, starting powder or fiber impurities, and/or the sintering atmosphere. One of the main agents causing such attack is $SiO_2$. We have performed thermodynamic calculations that indicate that the presence of carbon will suppress SiC degradation by means of $SiO_2$ attack. A more consistent surface compostion would result in more uniform reactions during processing and thus a more uniform microstructure in the final product. Additionally, the susceptibility of the SiC fibers to corrosion reactions, e.g., oxidation, are affected by the surface composition of the fibers. A variable (or incorrect) surface composition would therefore, result in an attack on some (or all) fibers, thereby leading to a poor product.

One way to solve the processing problem is to use additives or to change the process conditions for slip casting. However, in order to change the conditions, experimentation is required to develop new conditions. This means that every time a different source of fibers is used or a new batch of fibers from the same source is used, new conditions must be determined. Because this experimentation is very time consuming, it would disrupt the manufacturing process. Therefore, there is a need for a process to deposit a coating on said fibers which will give a consistent surface composition. It is desirable to be able to adjust the surface composition and chemistry over a range. A single type of coating may be desirable for one application, while another surface composition and chemistry may be appropriate for another application. Our invention allows one to systematically control the surface composition of the fibers by appropriate selection of particular silane coating agents and processing conditions.

The prior art methods of coating fibers are vastly different from the process of the present invention. For example, U.S. Pat. No. 4,131,697 discloses a method of coating carbon filaments with silicon carbide. This method involves passing the carbon filament into a first heated reactor (at 1100-1200° C.) containing silicon tetrachloride and hydrogen, followed by passing said filament into a second heated reactor containing methyltrichlorosilane and hydrogen thereby forming a silicon carbide coating of at least ten microns onthe filament.

Similarly, U.S. Pat. 4,373,006 describes an electrically nonconductive fiber comprising a carbon fiber coated with silicon carbide. Again the carbon fibers were coatd with silicon carbide by passing the carbon fibers through a heated chamber (1100°-1200° C.) containing methyldichlorosilane plus methane or hydrogen.

In marked distinction, the process of the present invention comprises contacting fibers with an organochlorosilane and heating at a temperature of about 350° C. in an air or a non-oxidizing atmosphere (depending on the desired final composition) to form a coating having the formula $SiC_xO_y$ on said fiber. A preferred method of coating the fibers is to impregnate the silicon carbide fibers with a solution of the organochlorosilane, drying the impregnated fibers and then heating as described above. The instant invention differs in several ways from the prior art. First, the fibers are not heated to extremely high temperatures (350° C. versus 1,000° C.). Second, only an organochlorosilane is used to form the coating. That is, the instant invention does not react an organochlorosilane with methane or hydrogen as described in the prior art.

A third distinction between the instant invention and the prior art is that applicants have discovered that the composition of the coating can be carefully controlled by choosing the appropriate organochlorosilane and by controlling the atmosphere during heating. The prior art discloses that the coating may be either SiC or $SiO_2$ (see U.S. Pat. No. 4,373,006, column 2, lines 18–20). In contrast to this the coating of the instant invention has the empirical formula $SiC_xO_y$, where x ranges from about 0.4 to about 2.7 and y ranges from about 0.4 to about 3.2. Thus, virtually an infinite number of compositions are possible using the instant invention, whereas only two compositions are possible using the process of the prior art.

The instant invention provides a simple and effective method of applying a uniform coating to fibers such that the surface composition of said fibers is controlled and always the same. Using our invention the surface composition may be chosen from a wide range of compositions. This means that regardless of the sourjce of the fibers, the instant invention provides fibers which have a desired surface compostion and surface chemstry. The practical effect of controlling the surface composition of fibers is that slip casting can be performed using one set of process conditions, composites can be fabricated with controlled interface, thereby yielding better mechanical properties, and oxidation resistance may be imparted to the fibers.

SUMMARY OF THE INVENTION

The instant invention relates to a method of applying a coating to silicon carbide fibers comprising contacting the silicon carbide fibers with an organochlorosilane, and heating the fibers at a temperature of about 300° to about 500° C. for a time sufficient to form a coating on the fibers, which coating has the formula $SiC_xO_y$ where x ranges from about 0.4 to about 2.7 and y ranges from about 0.4 to about 3.2.

A preferred embodiment of the invention is a method of applying a coating to silocon carbide fibers comprising contacting the silicon carbide fibers with a solution of an organochlorsilane, drying and heating the impregnated fibers at a temperature of about 300° to about 500° C. for a time sufficient to form a coating on the fibers.

Accordingly, a specific embodiment of the instant invention comprises impregnating 10 to 100 micron long silicon carbide fibers with an ether solution containing 1,6-bis(trichlorosilyl)hexane, drying and heating the fibers in air at a temperature of about 350° C.

DETAILED DESCRIPTION OF THE INVENTION

As hereinbefore stated, the instant invention relates to a method of applying a coating to fibers. The instant process may be used to coat various types of fibers such as alumina, glass, nickel-carbon, silicon carbide, etc. The present process is particularly suited for coating silicon carbide fibers and especially short SiC fibers. By short fibers is meant fibers which are about 10 to about 100 microns long.

An essential component of the present process is an organochlorosilane compound. The organochlorosilane compound which can be used in the present invention has the general formula $R'(R)_x$-Si-$Cl_y$ or $Cl_3$-Si-$R''$-$Cl_3$ where R is linear, branched, cyclic, aromatic or arylaromatic hydrocarbon having from 1 to about 20 carbon atoms, R' is either the same as R or is an alkyl or alkenyl ester having from 2 to about 20 carbon atoms, R" is linear or branched hydrocarbon having about from 2 to about 20 carbon atoms, x is 0, 1, or 2 and y is 3-x. Illustrative of these organochlorosilanes are: 2-acetoxyethyltrichlorosilane, 2-acetoxyethyldimethylchlorosilane, 2-acetoxyethylmethyldichlorosilane, 3-acetoxypropyldimethylchlorosilane, allyldimethylchlorosilane, allyltrichlorosilane, vinyldimethylchlorosilane, vinylmethyldichlorosilane, ethyldimethylchlorosilane, ethyltrichlorosilane, n-propyldimethylchlorosilane, n-butyldimethylchlorosilane, t-butyldimethylchlorosilane, n-butyltrichlorosilane, t-butyldiphenylchlorosilane, t-butylphenyldichlorosilane, n-butylmethyldichlorosilane, t-butyltrichlorosilane, (p-t-butylphenethyl)dimethylchlorosilane, amylmethyldichlorosilane, amyltrichlorosilane, benzyldimethylchlorosilane, benzyltrichlorosilane, n-hexyltrichlorosilane, n-hexylmethydichlorosilane, n-heptyltrichlorosilane, n-heptylmethyldichlorosilane, n-octyltrichlorosilane, n-octyldimethylchlorosilane, n-nonyltrichlorosilane, n-decyltrichlorosilane, n-hexadecyltrichlorosilane, n-heptadecyltrichlorosilane, n-octadecyltrichlorosilane, 1,2-bis(trichlorosilyl)ethane, 1,3-bis(trichlorosilyl)propane, 1,4-bis(trichlorosilyl)butane, 1,5-bis(trichlorosilyl)pentane, 1,6-bis(trichlorosily)hexane, 1,7-bis(trichlorosilyl)heptane, 1,8-bis(trichlorlsily)octant, di-n-butyldichlorosilane, di-t-butyldichlorosilane, di-n-butylmethylchlorosilane, diethyldichlorosilane, dihexyldichlorosilane, diphenyldichlorosilane, diphenylvinylchlorosilane, di-n-propyldichlorosilane, n-dodecyltrichlorosilane, eicosyltrichlorosilane, n-tetradecyltrichlorosilane, p-tolytrichlorosilane, p-tolylmethyldichlorosilane, undecytrichlorosilane, tri-n-propylchlorosilane, phenylethyldichlorosilane, methylphenyldichlorosilane, phenylmethylvinylchlorosilane, phenyltrichlorosilane, tri-n-butylchlorosilane, cyclohexyltrichlorosilane, cyclohexyldimethylchlorosilane, etc. Additionally, a cyclochlorosilane of formula

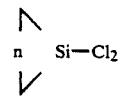

where n is from 3 to about 7 carbon atoms may be used. Illustrative examples of these cyclochlorosilanes are: 1,1-dichloro-1-silacyclopropane, 1,1-dichloro-1-silacyclobutane, 1,1-dichloro-1-1-silacylcopentane, etc.

The number of carbonatoms present in the organochlorsilane is one factor which may be used to control the Si:C ratio of the coating. Thus, if only a small amount of carbon is desired in the final coating, then an organochlorosilane with a small hydrocarbon radical is preferable, whereas if a large amount of carbon is desired then an organochlorosilane containing a hydrocarbon radical with a large number of carbon atoms is preferable.

In a preferred method of preparation, the organochlorosilane compound may be dissolved in any suitable organic solvent to give a solution of the organochlorsilanes. The only criteria imposed on the organic solvent are: 1)the the organochlorosilane be soluble in the solvent and 2) that the organochlorosilane not react with the solent, e.g., solvents with hydroxyl groups are unacceptable. Examples of the organic solvents which can be used are ether, benzene, tolulene, hexane, methylene chloride, etc.

The concentration of the organochlorosilane in the solution is not critical to the process of this invention. Since only a small amount of the organochlorosilane will be impregnated onto the fibers, the solution will usually contain an excess of the organochlorosilane. For convenience the solution should contain a concentration of the organochlorosilane from about 0.1 to about 10 weight percent of the organic solvent.

Having obtained a solution of the organochlorosilane, the next step in the process of this invention is to contact the fibers with the organochlorosilane. This can be done either in a batch process or a continous process, with the batch process being preferred for short fibers and the continous process preferred for long continuous fibers. If a batch process is desired, any well known method of contacting the fibers with the organochlorosilane solution may be used. For example, the fibers may be dipped into the solution or the solution may be added to a container containing the fibers followed by removal of any excess solution by filtration, decantation, etc. If a continuous process is desired, then one method of contacting the fiber with the organochlorosilane is to pass the fiber through a trough containing a solution of the organochlorsilane.

Although it is preferable to use a solution of the organochlorosilane, the organochlorosilane may be used neat. Additionally, the organochlorosilane may be vaporized and the fiber continuously pass through this vapor or a batch of the fibers may be placed in the vapor as is known in the art.

Regardless of the method of contacting the fibers with the desired organochlorosilane, the organochlorosilane is contacted with the fibers for a time of at least 5 seconds, thereby ensuring that the organochlorosilane reacts with the fiber surface and is deposited onto the fiber surface. Although the reaction between the organochlorosilane and the fiber surface is virtually instantaneous, a longer contact time of about 15 seconds to about 30 minutes is preferable to allow the organochlorosilane to completely coat the fiber surface. Since the solvents and the organchlorosilane compounds are oxygen and water sensitive, it is necessary to carry out the operation under a dry non-oxidizing atmosphere such as nitrogen, argon, etc. It is convenient to contact the organochlorosilane with the fibers at ambient temperatures, although both elevated temperatures and lower than ambient temperatures may be employed.

The fibers which have been contacted with an organochlorosilane are now dried (usually at room temperature) and then heated to a temperature of about 300° to about 500° C. for a time of about 20 to about 200 minutes. The drying step is not necessary if the fibers and organochlorosilane are contacted in the vapor phase. The heating decomposes the organochlorosilane and forms a Si-C-O coating on the surface of the fibers. The final composition of the coating has the formula $SiC_xO_y$, where x ranges from about 0.4 to about 2.7 and y ranges from about 0.4 to about 3.2.

the amount of carbon and oxygen present on the surface of the fibers is determined by the number of carbon atoms in the organochlorosilane and the atmosphere in which the heating takes place. Thus, if a coating with a low oxygen content is desired, then it is preferred that an organchlorosilane with a large hydrocarbon radical be used and that the fibers be heated in a nonoxidizing atmosphere such as nitrogen, argon, helium, etc. However, if a high oxygen content is desired, then it is preferred that an organochlorosilane with a small hydrocarbon radical be used and that the fibers be heated in an oxidizing atmosphere such as air, oxygen, etc. If the Si:C:O ratio is not what is desired, the above procedure may be repeated as many times as necessary to arrive at the desired Si:C:O ratio.

The following examples are presented in order to more fully illustrate the advantages to be derived from the instant invention. It is to be understood that the examples are by way of illustration only and are not intended as an undue limitation on the broad scope of the invention as set forth in the appended claims. The surface chemistry and composition were determined by a standard analytical technique, x-ray photoelectron spectroscopy (XPS). This technique yields the composition of a surface layer 1 to 10 nm deep. In addition to composition, XPS reveals the binding energy of each type of atom. For example, consider the binding energies of C atoms. All of the examples that follow contain a portion of C atoms which have a binding energy of 282.4 eV; this corresponds to SiC. Most of the examples also have C peaks at energies close to 284 eV; these correspond to a more oxygenated species - typically a Si-O-C glass. In a similar vein, a higher oxygen peak energy corresponds to an oxide that is more like $SiO_2$ than a Si-O-C glass. Such differences, although apparently subtle, can have a significant impact upon dispersion characteristicsand eventual bonding in a composite.

EXAMPLE I

A special airtight apparatus was constructed, consisting of an extraction tube, capable of holding a paper thimble containing the fibers to be coated, situated between two specially designed round bottom flasks with side-arm attachments. Work was performed under either positive nitrogen gas pressure or vacuum conditions. Positive nitrogen pressure was maintained when the system was opened so that oxygen-or water-sensitive chemicals were not contaminated.

All solutions were prepared in a glove box under a nitrogen atmosphere and placed in round bottom flasks with side arm attachments. Into a first round bottom flask there was placed 250 ml of ether containing 0.40 g of 1,6-bis(trichlorosilyl)hexane. About 2.0 grams of SiC fibers (manufactured by Tateho Chemical Industries and indentified as SCW #1) were placed in a thimble which thimble was inserted into the extraction tube of the coating apparatus. The first round bottom flask was attached to the top of the extraction tube and a second round bottom flask (which was emply) was attached to the bottom of the extraction tube. After evacuating and purging the extraction tube and round bottom flasks with nitrogen, part of the ether solution in the top flask was released and covered the fibers. After ten minutes had elapsed, the remainder of the solution was released causing the solution in the extraction tube to drain into the bottom flask. The thimble was removed, and the fibers were allowed to dry at room temperature for about one hour. The fibers were removed from the thimble placed in a glass tube in a furnace and heated in air at a temperature of 345° for 80 minutes. This sample was designated sample A. Sample A was analyzed using XPS and the results are presented in Table 1.

EXAMPLE II

The procedure set forth in Example I was used to put two more layers of coating onto sample A. This sample was designated sample B. Sample B was analyzed using XPS and the results are presented in Table 1.

EXAMPLE III

A new sample of fibers was treated as in Example I except that the heating was carried out at 350° C. in nitrogen atmosphere. This sample was designated sample C. Sample C was analyzed using XPS and the results presented in Table 1.

EXAMPLE IV

The procedure set forth in Example III was used to put two more layers of coating onto sample C. This sample was designated sample D. Sample D was analyzed by XPS and the results are presented in Table 1.

EXAMPLE V

A sample of SiC fibers manufactured by Tateho Chemical Industries and identified as SCW #1 was designated sample E. Sample E was analyzed by XPS and the results presented in Table 1.

The results of the XPS analyses of samples A, B, C, D and E are presented in Table 1 below.

TABLE 1

Surface Composition
Atomic Percent (Binding Energy in eV)

| Sample I.D. | A | B | C | D | E |
|---|---|---|---|---|---|
| Si 2p | 28.1(100.6) | 11.0(100.4) | 25.3(100.6) | 15.5(100.5) | 25.5(100.4) |
| Si 2p | 8.7(102.5) | 16.7(102.5) | 5.6(102.4) | 11.2(102.0) | 13.7(101.4) |
| C 1s | 24.3(282.4) | 11.4(282.4) | 22.5(282.4) | 15.4(282.4) | 29.8(282.4) |
| C 1s | 10.2(283.8) | 21.9(284.2) | 25.7(284.1) | 35.7(284.1) | 13.6(283.7) |
| O 1s | 5.1(530.3) | | | | 3.1(530.2) |
| O 1s | 23.6(531.8) | 39.0(531.9) | 20.9(531.6) | 22.3(531.7) | 14.1(531.7) |
| Si:C:O | 1:0.94:0.78 | 1:1.20:1.41 | 1:1.55:0.68 | 1:1.91:0.83 | 1:1.07:0.44 |

The results presented in Table 1 show the surface composition of the various samples. Thus, coating the fibers and then heating in air give a high oxygen content surface composition while heating in nitrogen reduces the oxygen content on the fiber surface and increases the carbon contents. Furthermore, the O peak binding energies are lower for the nitrogen heat treatments than the air heat treatments indicating that the nitrogen heat treatments result in a surface oxide that is more like Si-O-C and less like $SiO_2$. It is noted that when the heating was done in nitrogen, the resultant coating contained more surface oxygen than the untreated fiber (sample E.) This is owing to the fact that there may be some oxygen present in the nitrogen which was used during pyrolysis.

EXAMPLE VI

The following sample was coated in a glove box having a nitrogen atmosphere. In a round bottom flask there were placed 0.59 g of SiC fibers manufactured by Tateho Chemical Industries, 0.34 g of 1,6-bis(trichlorosilyl)hexane and 50 ml of dry ether. The flask was removed from the glove box and filtered to separate the fibers from the ether solution. The fibers were placed in a glass tube in a furnace and heated in air for one hour at 365° C. This sample was designated sample F.

EXAMPLE VII

The following sample was prepared in a glove box under a nitrogen atmosphere. In a round bottom flask there were placed 0.7 of SiC fibers manufactured by Tateho Chemical Industries, 0.37 g of 1,2-bis(trichlorosilyl)ethane and 50 of dry ether. The flask was removed from the glove box and filtered to separate the fibers from the ether solution. The fibers were placed in a glass tube in a furnace and heated in air for one hour at 365° C. This sample was designated sample G.

Samples F and G were analyzed by XPS to determine their surface composition. These results are presented in Table 2 along with the results of the uncoated fibers (sample E).

TABLE 2

Surface Composition
Atomic Percent (Binding Energy in eV)

| Sample I.D. | F | G | E |
|---|---|---|---|
| Si 2p | 14.0(100.5) | 9.1(100.7) | 25.5(100.4) |
| Si 2p | 15.7(102.5) | 22.5(102.4) | 13.7(101.4) |
| C 1s | 12.1(282.4) | 3.8(282.4) | 29.8(282.4) |
| C 1s | 17.5(283.9) | 22.8(283.9) | 13.6(283.7) |
| O 1s | 39.3(531.6) | 40.8(531.9) | 3.1(530.02) |
| O 1s | | | 14.1(531.7) |
| Si:C:O | 1:0.99:1.32 | 1:0.84:1.29 | 1:1.11:0.44 |

Thus, using an organochlorosilane with a smaller hydrocarbon radical gives a coating with a lower amount of carbon.

EMAMPLE VIII

A sample (2.6 g) of SiC fibers manufactured by Advanced Composite Materials Co. (ACMC), formerly ARCO Chemical Co., and identified as Sc-9 was coated using the procedure of Example I with the following modifications. Instead of 1,6-bis(trichlorosilyl)hexane, 1,4 g of n-octadecyltrichlorosilane dissolved in about 150 ml ether was used. After the organochlorosilane was deposited on the fibers the fibers were dividd into two sample, one weighing 1.1g and one weighing 1.3g. The sample weighing 1.1g was heated in air at 350° C. for about 1 hour. This sample was treated with n-octadecyltrichlorosilane and heated in air two more times. This sample was designated sample H and analyzed by XPS.

The sample weighing 1.3g was heated in nitrogen at 350° C. for 70 minutes. This sample was treated with n-octadecyltrichlorosilane and heated in nitrogen two more times. This sample was designated sample J and was analyzed by XPS.

EXAMPLE IX

A sample (2.1g) of SiC fibers manufactured by ACMC and identified as SC-9 was coated using the procedure of Example I with the following modifications. Instead of 1,6-bis(trichlorosilyl)hexane, 0.92g of 1,1-dichloro-1-silacyclopentane dissovled in about 150 ml ether was used. After the 1,1-dichloro-1-silacyclopentane was deposited onto the fibers and dried, the fibers were divided into two samples, one weighing 1.0g and one weighing 1.1g. The sample weighing 1.0go was heated in air at 350° C. for one hour. This sample was treated with 1,1-dichloro-1-silacyclopentane and heated in air two more times to give a sample which was designated sample K and analyzed by XPS.

The sample weighing 1.1g was heated in nitrogen at 350° C. for one nour. This sample was treated with cyclopentamethylenedichlorosilane and heated in nitrogen two more times to give a sample which was designated sample L and analyzed.

EXAMPLE X

An untreated sample of SiC fibers manufactured by ACMC and identified as SC-9 was designated as sample M and analyzed by XPS.

The analyses of samples H, J, K, L and M are presented in Table 3.

TABLE 3

| | Surface Composition of Whiskers Atomic Percent (Binding Energy in eV) | | | | |
|---|---|---|---|---|---|
| Sample I.D. | H | J | K | L | M |
| Si 2p | 13.9 (100.5) | 14.7 (100.5) | 18.9 (100.5) | 17.1 (100.5) | 20.7 (100.5) |
| Si 2p | 12.6 (102.2) | 7.0 (102.1) | 13.9 (102.3) | 15.5 (102.37) | 13.3 (102.2) |
| C 1s | 15.1 (282.4) | 16.3 (282.4) | 19.5 (282.4) | 16.4 (282.4) | 16.9 (282.4) |
| C 1s | 12.5 (284.1) | 35.7 (283.7) | 2.6 (284.1) | 12.8 (283.8) | 12.9 (283.0) |
| C 1s | 2.7 (285.7) | 3.6 (285.4) | — | — | — |
| C 1s | 2.0 (287.6) | — | — | — | — |
| O 1s | 41.2 (531.5) | 22.6 (531.3) | 45.1 (531.6) | 38.2 (531.6) | 35.2 (531.6) |
| Si:C:O | 1:1.22:1.55 | 1:2.56:1.04 | 1:0.67:1.37 | 1:0.89:1.17 | 1:0.68:0.8 |

These results show that fibers with a different initial surface composition can be successfully coated. Further, the composition of the surface coating can be varied over a wide range by the use of different organochlorosilanes and by controlling the heating atmosphere.

What is claimed is:

1. A method of applying a thin surface coating to silickon carbide fibers comprising contacting the silicon carbide fibers with an organochlorosilane and heating the silicon carbide fibers at a temperature of about 300° to about 500° C. for a time sufficient to form a coating on the fibers, which coating has the formula $SiC_xO_y$ where x ranges from about 0.4 to about 3.2.

2. The method of claim 1 further characterized in that the organochlorsilane is contacted with the silicon carbide fibers by impregnating the fibers with a solution of the organochlorosilane and then drying the impregnated fibers.

3. The method of claim 1 where the organochlorosilane has the formula $R'(R)_x\text{-}SiCl_y$ where R is a linear, branched, cyclic aromatic or arylaromatic hydrocarbon radical having from 1 to 20 carbon atoms, R' is either the same as R or is an alkyl or alkenyl ester having from 2 to 20 carbon atoms, x is 0, 1 or 2 and y is 3-x.

4. The method of claim 3 where the organochlorsilane is n-octadecyltrichlorosilane.

5. The method of claim 1 where the organochlorosilane has the formula $Cl_3\text{-}Si\text{-}R''\text{-}Si\text{-}Cl_3$ where R'' is a linear or branched hydrocarbon radical having from 2 to 20 carbon atoms.

6. The method of claim 5 where the organochlorosilane is 1,6-bis(trichlorosilyl)hexane.

7. The method of claim 1 where the heating is performed under an oxidizing atmosphere.

8. The method of claim 7 where the oxidizing atmosphere is air.

9. The method of claim 1 where the heating is performed under a nonoxidizing atmosphere.

10. The method of claim 9 where the nonoxidizing atmosphere is a nitrogen atmosphere.

11. The method of claim 1 where the organochlorsilane has the formula

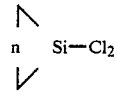

where n is from 3 to 7 carbon atoms.

12. The method of claim 11 where the organochlorosilane is 1,1-dichloro-1-silacyclopentane.

* * * * *

UNITED STATES PATENT AND TRADEMARK OFFICE
CERTIFICATE OF CORRECTION

PATENT NO. : 4,923,719

DATED : May 8, 1990

INVENTOR(S) : Keith R. Karasek, William L. Olson and Jeffry T. Donner

It is certified that error appears in the above-identified patent and that said Letters Patent is hereby corrected as shown below:

Column 1, line 6: "filers" should read --fibers--;

line 8: "reinfored" should read --reinforced--;

line 18: "in slip casting" should read --in the slip casting--;

line 36: "difference" should read --differences--;

line 37: "inforced" should read --reinforced--;

line 38: "Alumnina" should read --Alumina--;

line 56: "compostion" should read --composition--.

Column 2, line 24: "onthe" should read --on the--;

line 28: "coatd" should read --coated--;

line 68: "sourjce" should read --source--.

Column 3, line 2: "compostion" should read --composition--;

line 20: "silocon" should read --silicon--;

line 45: "is linear" should read --is a linear--;

line 49: "is linear" should read --is a linear--;

UNITED STATES PATENT AND TRADEMARK OFFICE
CERTIFICATE OF CORRECTION

PATENT NO. : 4,923,719

DATED : May 8, 1990

INVENTOR(S) : Keith R. Karasek, William L. Olson and Jeffry T. Donner

It is certified that error appears in the above-identified patent and that said Letters Patent is hereby corrected as shown below:

Column 3, line 54: after "3-acetoxypropyldimethylchlorosilane" insert --3-acryloxypropyldimethylchlorosilane,--;

Column 4, line 5: "1,8-bis(trichlorlsily)octant" should read -1,8-bis(trichlorosilyl)octane--;

line 28: "1,1-dichloro-1-1-silacycylcopentane" should read --1,1-dichloro-1-silacyclopentane--;

line 29: "carbonatoms" should read --carbon atoms--;

line 30: "organochlorsilane" should read --organochlorosilane--;

line 40: "organochlorsilanes" should read --organochlorosilanes--;

line 42: "the the" should read --that the--;

line 46: "tolulene" should read --toluene--;

line 59: "continous" should read --continuous--;

line 61: "continous" should read --continuous--.

UNITED STATES PATENT AND TRADEMARK OFFICE
CERTIFICATE OF CORRECTION

PATENT NO. : 4,923,719

Page 3 of 4

DATED : May 8, 1990

INVENTOR(S) : Keith R. Karasek, William L. Olson and Jeffry T. Donner

It is certified that error appears in the above-identified patent and that said Letters Patent is hereby corrected as shown below:

Column 5, line 3: "organochlorsilane" should read --organochlorosilane--;

line 7: "pass" should read --passed--;

line 20: "organchlorosilane" should read --organochlorosilane--;

line 38: "the" should be "The";

line 43: "organchlorosilane" should read --organochlorosilane--.

Column 6, line 25: "indentified" should read --identified--;

line 29: "emply" should read --empty--.

Column 8, line 25: "Sc-9" should read --SC-9--;

line 30: "dividd" should read --divided--;

line 31: "sample" should read --samples--;

line 47: "trichclorosilyl)hexane" should read --trichlorosilyl)hexane--;

line 48: "dissovled" should read --dissolved--;

line 52: "1.0go" should read --1.0g--.

UNITED STATES PATENT AND TRADEMARK OFFICE
CERTIFICATE OF CORRECTION

PATENT NO. : 4,923,719

DATED : May 8, 1990

INVENTOR(S) : Keith R. Karasek, William L. Olson and Jeffry T. Donner

It is certified that error appears in the above-identified patent and that said Letters Patent is hereby corrected as shown below:

Column 9, line 25: "silickon" should read --silicon--;

line 30: after "0.4" insert --to about 2.7 and y ranges from about 0.4--;

line 32: "organochlorsilane" should read --organochlorosilane--;

line 37: "$SiCl_v$" should read --$SiCl_y$--.

Column 10, line 13: "organochlorsilane" should read --organochlorosilane--;

line 29: "atmopshere" should read --atmosphere--;

line 30: "organochlorsilane" should read --organochlorosilane--.

Signed and Sealed this

Seventh Day of April, 1992

Attest:

HARRY F. MANBECK, JR.

Attesting Officer  Commissioner of Patents and Trademarks